(12) United States Patent
Kuo et al.

(10) Patent No.: US 9,395,435 B2
(45) Date of Patent: Jul. 19, 2016

(54) SIGNAL GENERATING METHOD AND RADAR SYSTEM

(71) Applicant: Wistron NeWeb Corporation, Hsinchu (TW)

(72) Inventors: Chi-Cheng Kuo, Hsinchu (TW); Jeng-Da Li, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 345 days.

(21) Appl. No.: 13/974,060

(22) Filed: Aug. 23, 2013

(65) Prior Publication Data

US 2014/0354470 A1    Dec. 4, 2014

(30) Foreign Application Priority Data

May 31, 2013 (TW) .............................. 102119372 A (51) Int. Cl.
*G01S 13/93* (2006.01)
*G01S 7/35* (2006.01)
*G01S 13/34* (2006.01)
*G01S 7/02* (2006.01)

(52) U.S. Cl.
CPC . *G01S 7/35* (2013.01); *G01S 7/023* (2013.01); *G01S 13/345* (2013.01); *G01S 13/347* (2013.01); *G01S 13/931* (2013.01)

(58) Field of Classification Search
CPC .......... G01S 7/35; G01S 7/023; G01S 13/347

USPC ..................................................... 342/70, 200
See application file for complete search history.

(56) References Cited

U.S. PATENT DOCUMENTS

| 5,959,570 A * | 9/1999 | Russell | G01S 7/4004 342/70 |
| 7,342,532 B1 * | 3/2008 | Matsuoka | G01S 7/032 342/118 |
| 2006/0262007 A1 * | 11/2006 | Bonthron | G01S 13/34 342/70 |
| 2010/0245160 A1 * | 9/2010 | Sakurai | G01S 7/4008 342/200 |
| 2011/0234448 A1 * | 9/2011 | Hayase | G01S 13/18 342/70 |
| 2012/0242530 A1 * | 9/2012 | Luebbert | G01S 13/22 342/70 |

* cited by examiner

*Primary Examiner* — Jack W Keith
*Assistant Examiner* — Marcus Windrich
(74) *Attorney, Agent, or Firm* — Winston Hsu; Scott Margo (57) ABSTRACT

A signal generating method for a radar system includes generating a first chirp signal and a second chirp signal having a first time delay relative to the first chirp signal; and combining the first chirp signal and the second chirp signal to determine a frequency modulated signal, wherein the first chirp signal and the second chirp signal are N-step linear stepped frequency modulated continuous waves having the same frequency modulation bandwidth, such that the frequency modulated signal includes i steps of the first chirp signal in a first duration, an interleaved combination of N−i steps of the first chirp signal and N−i steps of the second chirp signal in a second duration, and i steps of the second chirp signal in a third duration.

16 Claims, 6 Drawing Sheets

SIGNAL GENERATING METHOD AND RADAR SYSTEM

BACKGROUND OF THE INVENTION

1. Field of the Invention

The present invention relates to a signal generating method and a radar system, and more particularly, to a signal generating method and a radar system capable of differentiating ghost targets, reducing false detection rate significantly, providing high speed resolution and high distance resolution as well as simplifying the detection algorithm.

2. Description of the Prior Art

Generally, different forms of radar transmission waves correspond to different detection methods, and the forms of radar transmission waves and the corresponding detection methods are important factors that affect performance of entire radar systems. In the prior art, transmission waves composed of linear frequency modulated continuous waves (LFMCWs) can be used for estimating distance and speed of a target, and therefore are often applied to a radar system to generate the transmission signal.

Nevertheless, in an environment with multiple targets (i.e. a noisy environment), interference among radar systems has been greatly increased due to a proliferation of the conventional radar systems. In other words, a signal received by a radar system may be a transmission signal transmitted by another of the same kind of radar system on a target, but not a reflected signal of the radar system itself, which may result in false detection. For example, if any two vehicles respectively equipped with a radar system A and a radar system B using the same form of transmission waves exist in an environment, wherein a distance between the radar system A and the radar system B is R, the transmission signal of the radar system B may interfere with the reflected signal of the radar system A. That is, the radar system A may receive two receiving signals in the same time, including a signal transmitted by the radar system A and then reflected by the radar system B, and a transmission signal of the radar system B. For the radar system A, the transmission signal of the radar system B may interfere with the receiving signal (i.e. the reflected signal) of the radar system A. When a receiver of the radar system A performs related processing for the receiving signals, the radar system A may be misled to come out a wrong result that shows two targets exist in the environment, since the relativity of these two receiving signals and the transmission signal of the radar system A are quite high. In such a condition, one target is a real target where the radar system B is located with the distance R; however, the other target is a ghost target with a distance R/2. The ghost target causes false detection of the radar system, and the false detection rate may be as high as 50%. When more radar systems of the same kind exist in the environment, the false detection rate becomes even higher.

On the other hand, the radar system should be able to detect the distance and the speed of the target while achieving high resolution and accuracy. Besides, there are many challenges for designing a radar system, such as requirements to distinguish moving targets and steady targets, and to recognize multiple targets and ghost targets. In addition, the conventional detection algorithm may be too complex and need to be simplified. Therefore, how to provide a radar system with improved detection performance in a noisy environment and with high-speed and long-distance resolution has become a common goal in the industry.

SUMMARY OF THE INVENTION

The present invention provides a signal generating method and a radar system used for differentiating ghost targets and reducing false detection rate in a noisy environment as well as enhancing a radar performance for high speed resolution and high distance resolution.

The present invention discloses a signal generating method for a radar system. The method includes generating a first chirp signal and a second chirp signal having a first time delay relative to the first chirp signal; combining the first chirp signal and the second chirp signal to determine a frequency modulated signal, wherein the first chirp signal and the second chirp signal are N-step linear stepped frequency modulated continuous waves having a same first frequency modulation bandwidth, such that the frequency modulated signal comprises i steps of the first chirp signal in a first duration, an interleaved combination of N−i steps of the first chirp signal and N−i steps of the second chirp signal in a second duration, and i steps of the second chirp signal in a third duration, where i is smaller than N; and emitting the frequency modulated signal.

The present invention further discloses a radar system, including a transmitting device and at least one receiving device which are used for transmitting a frequency modulated signal and receiving reflected signals of the frequency modulated signal, respectively. The transmitting device includes a chirp signal generator, for generating a first chirp signal and a second chirp signal having a first time delay relative to the first chirp signal; a signal processing module, for combining the first chirp signal and the second chirp signal to determine a frequency modulated signal, wherein the first chirp signal and the second chirp signal are N-step linear stepped frequency modulated continuous waves having a same first frequency modulation bandwidth, such that the frequency modulated signal comprises i steps of the first chirp signal in a first duration, an interleaved combination of N−i steps of the first chirp signal and N−i steps of the second chirp signal in a second duration, and i steps of the second chirp signal in a third duration, where i is smaller than N; and a transmitting antenna, for emitting the frequency modulated signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
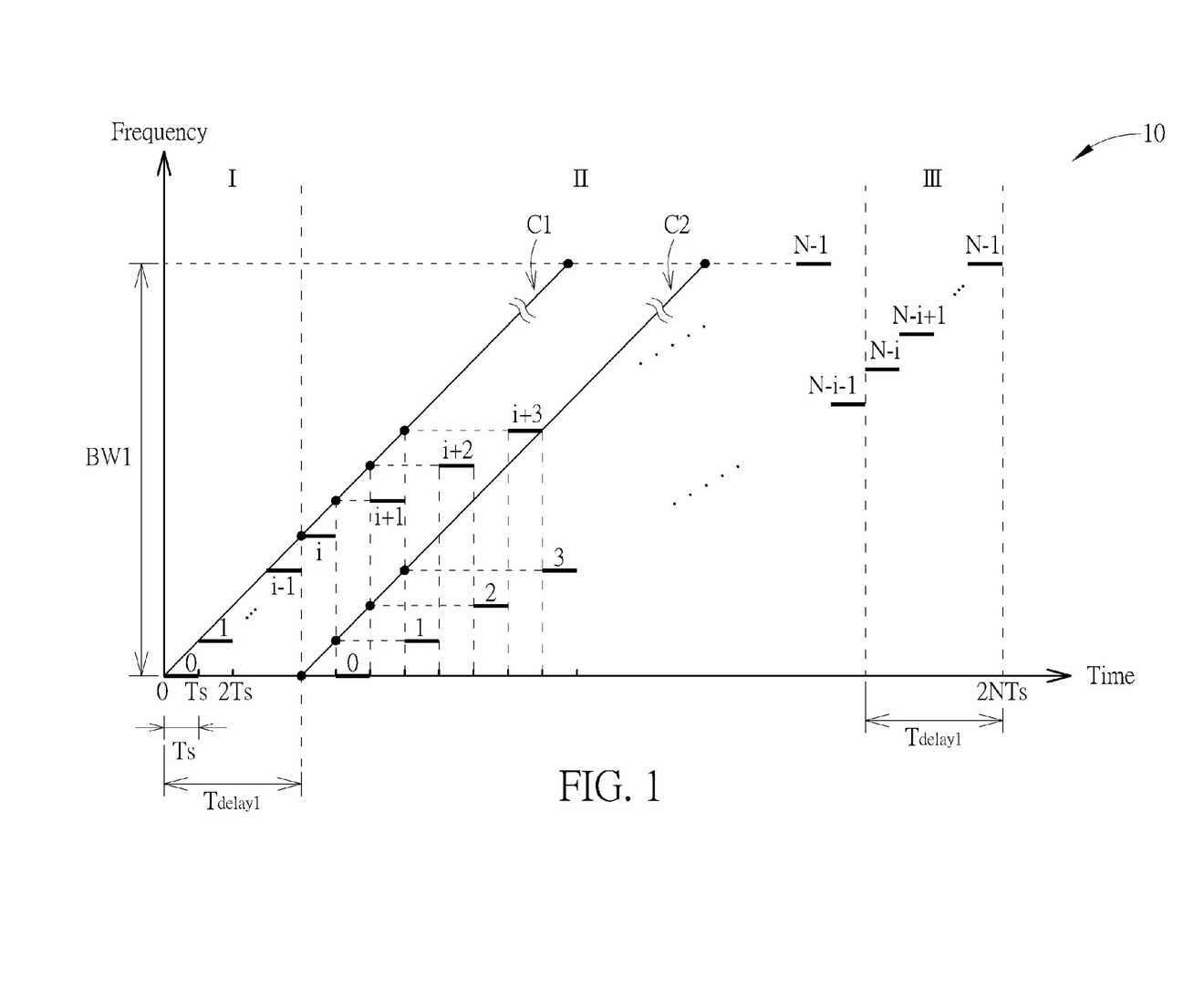
FIG. 1 is a time-frequency diagram of a frequency modulated signal according to an embodiment of the present invention.

Please refer to FIG. 1, which is a time-frequency diagram of a frequency modulated signal 10 according to an embodiment of the present invention. The frequency modulated signal 10 is used as a radar transmitting wave in a radar system. The frequency modulated signal 10 includes chirp signals C1 and C2, which are in a form of a linear frequency modulated continuous wave (LFMCW). Both of the chirp signals are N-step linear stepped frequency modulated continuous waves with the same frequency modulation bandwidth BW1. The radar system uses a sample and hold circuit to generate each step of the chirp signals C1 and C2 for transmitting the frequency modulated signal 10. The chirp signal C2 has a time delay $T_{delay1}$ relative to the chirp signal C1. Therefore, the total transmission time of the frequency modulated signal 10 can be divided into durations I-III, wherein the frequency modulated signal 10 includes i steps of the chirp signal C1 in the duration I, an interleaved combination of N−i steps of the chirp signal C1 and N−i steps of the chirp signal C2 in the duration II, and i steps of the chirp signal C2 in a duration III. Since the frequency modulated signal 10 is composed of multiple N-step linear stepped frequency modulated continuous waves, the radar system employing the frequency modulated signal 10 may provide high-speed and long-distance resolution, and a detection algorithm of the radar system may be simplified. In addition, the time delay $T_{delay1}$ may be served as a programmable parameter of the radar system. As a result, when multiple radar systems transmitting frequency modulated signals according to embodiments of the present invention exist in the same environment, the radar systems can be configured with different time delay $T_{delay1}$ such that the radar transmitting waves thereof have low relativity among each other. Therefore, the radar systems may have no interference among each other, which reduces the false detection rate of the radar systems.

In detail, as shown in FIG. 1, each of the chirp signals C1 and C2 includes N steps, wherein a time interval between each step is $T_s$. Therefore, the total transmission time needed for the radar system to completely transmit chirp signals C1 and C2 is $2NT_s$. The transmitting frequency of the chirp signals C1 and C2 is represented by the following equation:

$$f_1[n]=f_2[n]=f_0+S_1 \times n \times T_s, n=0,1,\ldots,N-1 \quad (1)$$

where $f_0$ represents the initial frequency, $f_1$ represents the transmitting frequency of the chirp signal C1, $f_2$ represents the transmitting frequency of the chirp signal C2, and n represents the step number of the chirp signal C1 or C2. $S_1$ is the slope of the chirp signal C1 or C2, which is determined by the frequency modulation bandwidth BW1 and the time interval $T_s$, and can be represented by the following equation:

$$S_1 = \frac{BW1}{NT_s} \quad (2)$$

The frequency modulated signal 10 composed of the chirp signals C1 and C2 may be determined by the following equation:

$$f_p[k] = \begin{cases} f_1[k], & \forall k = 0 \sim i-1 \\ f_1\left[\frac{k+i}{2}\right], & \mod(k,2)=\mod(i,2) \text{ and } \forall k = i \sim 2 \times N - i - 1 \\ f_2\left[\frac{(k-1-i)}{2}\right], & \mod(k,2) \neq \mod(i,2) \text{ and } \forall k = i \sim 2 \times N - i - 1 \\ f_2[k-N], & \forall k = 2 \times N - i \sim 2 \times N - 1 \end{cases} \quad (3)$$

where $f_p$ represents the transmitting frequency of the frequency modulated signal 10, k represents step number of the chirp signals C1 and C2 (i.e. frequency modulated signal 10), and $i=T_{delay1}/T_s$. Since the total step number of the chirp signals C1 and C2 is 2N, k is a value from 0 to 2N−1. From above, the durations I, II and III of the frequency modulated signal 10 are determined by the time delay $T_{delay1}$. In the duration I, the transmitting frequency of the frequency modulated signal 10 is represented by the first row of the equation (3), and the step number is between 0 and i−1, wherein the transmitting frequency $f_p[k]$ is determined by $f_1[k]$. In the duration II, the transmitting frequency of the frequency modulated signal 10 is represented by the second and the third rows of the equation (3), and the step number is between i and $2 \times N - i - 1$, wherein the transmitting frequency is composed of $$f_1\left[\frac{k+i}{2}\right]$$

and $$f_2\left[\frac{(k-1-i)}{2}\right].$$

When $\mod(k,2)=\mod(i,2)$, waves with the corresponding frequency of $$f_1\left[\frac{k+i}{2}\right]$$

are transmitted, and when $\mod(k,2) \neq \mod(i,2)$, waves with the corresponding frequency of $$f_2\left[\frac{(k-1-i)}{2}\right]$$

are transmitted. In duration III, the transmitting frequency of the frequency modulated signal 10 is represented by the fourth row of the equation (3), and the step number is between $2 \times N - i$ and $2 \times N - 1$, wherein the transmitting frequency $f_p[k]$ is determined by $f_2[k-N]$, i.e., in the duration III, the frequency modulated signal 10 only includes the last i steps of the chirp signal C2.

Take $T_{delay1}=2T_s$ and N=256 as an example, the step number k of the frequency modulated signal 10 is between 0 and 511, and i=2. In the duration I, k is between 0 and 1, and the transmitting frequency $f_p[k]$ is determined by $f_1[k]$, i.e., the transmitting frequency is equal to $f_1[0]$ and then $f_1[1]$. In the duration II, k is between 2 and 509. When k is equal to 2, both the values of $\mod(k,2)$ and $\mod(i,2)$ are equal to 0, and therefore, the transmitting frequency is $f_1[2]$; when k is equal to 3, the value of $\mod(k,2)$ is equal to 1, which is not equal to the value of $\mod(i,2)$, and therefore the transmitting frequency is $f_2[0]$; then the radar system transmits waves with the transmitting frequencies $f_1[3]$, $f_2[1]$, $f_1[4]$, $f_2[2]$, ..., $f_1[255]$, $f_2[253]$ in order. In other words, after the radar system transmits i steps of the chirp signal C1, the radar system transmits waves with the frequencies $$f_1\left[\frac{k+2}{2}\right]$$

and $$f_2\left[\frac{(k-3)}{2}\right]$$

by turns (i.e. by serially interleaving the chirp signal C1 and the chirp signal C2), and after the time delay $T_{delay1}$ is determined, the number of steps transmitted for the initial consecutive i steps of the chirp signal C1 is determined. In the duration III, k is between 510 and 511, and the radar system continues to transmit waves with the transmitting frequencies $f_2[254]$ and $f_2[255]$.

Noticeably, FIG. 1 is an embodiment of the present invention, and those skilled in the art can make modifications or alterations accordingly. For example, the frequency modulated signal 10 may be composed by two sets of up-chirp signals as shown in FIG. 1, or may be composed by two sets of down-chirp signals. Alternatively, the frequency modulated signal may be composed by a combination of up-chirp signals and down-chirp signals. Also, the step numbers and the frequency modulation bandwidths corresponding to the up-chirp or down-chirp signals are not limited.

Figure 2:
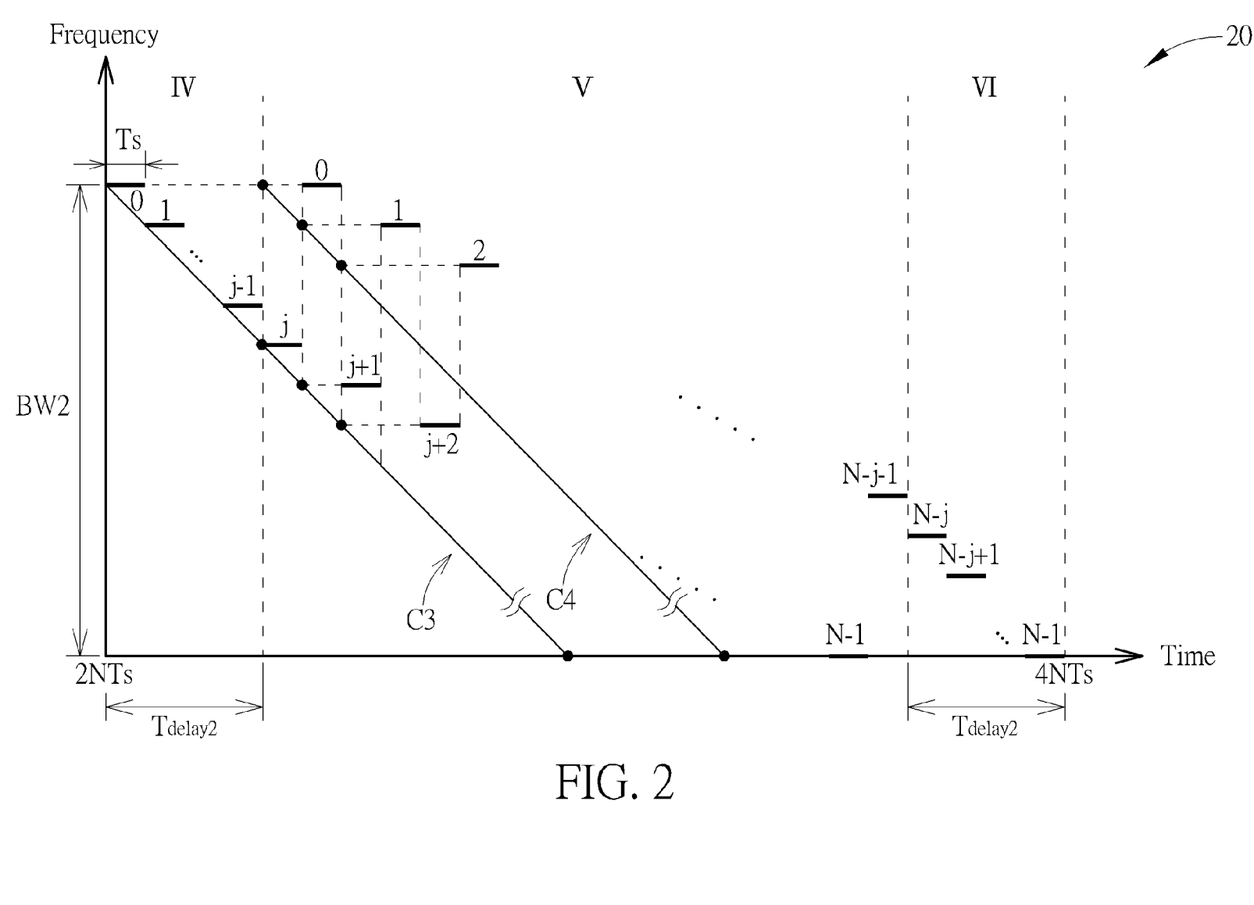
FIG. 2 is a time-frequency diagram of a frequency modulated signal according to an embodiment of the present invention.

Please refer to FIG. 2, which is a time-frequency diagram of a frequency modulated signal 20 according to an embodiment of the present invention. The frequency modulated signal 20 is composed of chirp signals C1-C4. After the radar system finishes transmitting the chirp signals C1-C2 according to the example shown in FIG. 1 (i.e. after $2NT_s$), the radar system continues to transmit the chirp signals C3 and C4. To simplify the illustration, the chirp signals C1-C4 are configured to be N-step linear stepped frequency modulated continuous waves, and only the chirp signals C3 and C4 are shown in the time-frequency diagram of FIG. 2 (i.e. the diagram shows the frequency modulated signal 20 only from $2NT_s$ to $4NT_s$ in time axis). As shown in FIG. 2, the chirp signals C3 and C4 have the same frequency modulation bandwidth BW2, and the chirp signal C4 has a time delay $T_{delay2}$ relative to the chirp signal C3. Therefore, the frequency modulated signal 20 includes only j steps of the chirp signal C3 in a duration IV, an interleaved combination of N−j steps of the chirp signal C3 and N−j steps of the chirp signal C4 in a duration V, and j steps of the chirp signal C4 in a duration VI, wherein $j=T_{delay2}/T_s$, which may be another programmable parameter of the radar system.

The step numbers of the chirp signals C3 and C4 are not limited, i.e., the step numbers of the chirp signals C3 and C4 may be different from the step number N of the chirp signal C1 or C2. In order to simplify the equations and the illustration, the following examples use the same step number N for illustrating the present invention. In detail, the transmitting frequency of the chirp signals C3 and C4 may be represented by the general formula below:

$$f_3[n]=f_4[n]=f_0+BW2-S_2\times n\times T_s, n=0,1,\ldots,N-1 \quad (4)$$

where $f_0$ represents the final frequency, $f_3$ represents the transmitting frequency of the chirp signal C3, $f_4$ represents the transmitting frequency of the chirp signal C4, n represents the step number of the chirp signal C3 or C4. $S_2$ is the slope determined by the frequency modulation bandwidth BW2 and the time interval $T_s$ of the chirp signals C3 and C4, and is represented by the following equation:

$$S_2 = \frac{f_0+BW2}{NT_s} \quad (5)$$

The frequency modulated signal 20 composed of the chirp signals C1-C4 may be divided into the six durations I-VI, and may be represented by the following equation:

$$f_p[k] = \begin{cases} f_1[k], & \forall k=0\sim i-1 \\ f_1\left[\frac{k+i}{2}\right], & \text{mod}(k,2)=\text{mod}(i,2) \text{ and } \\ & \forall k=i\sim 2\times N-i-1 \\ f_2\left[\frac{(k-1-i)}{2}\right], & \text{mod}(k,2)\neq\text{mod}(i,2) \text{ and } \\ & \forall k=i\sim 2\times N-i-1 \\ f_2[k-N], & \forall k=2\times N-i\sim 2\times N-1 \\ f_3[k-2N], & \forall k=2N\sim 2N+j-1 \\ f_3\left[\frac{(k-2N+j)}{2}\right], & \text{mod}(k,2)=\text{mod}(j,2) \text{ and } \\ & \forall k=2N+j\sim 4\times N-j-1 \\ f_4\left[\frac{(k-2N-j-1)}{2}\right], & \text{mod}(k,2)\neq\text{mod}(j,2) \text{ and } \\ & \forall k=2N+j\sim 4\times N-j-1 \\ f_4[k-3N], & \forall k=4\times N-j\sim 4\times N-1 \end{cases} \quad (6)$$

where $f_p$ represents the transmitting frequency of the frequency modulated signal 20, $f_1$ represents the transmitting frequency of the chirp signal C1, $f_2$ represents the transmitting frequency of the chirp signal C2, $f_3$ represents the transmitting frequency of the chirp signal C3, $f_4$ represents the transmitting frequency of the chirp signal C4, k represents step number of the chirp signals C1-C4 (i.e. frequency modulated signal 20).

The durations I-III of the frequency modulated signal 20 are determined by the time delay $T_{delay1}$, and the durations IV-VI are determined by the time delay $T_{delay2}$. In the durations I-III, the transmitting frequency of the frequency modulated signal 20 is the same with that of the frequency modulated signal 10 shown in FIG. 1. In the duration IV, the transmitting frequency of the frequency modulated signal 20 is represented by the fifth row of the equation (6), wherein the step number is between 2N and 2N+j−1, and the transmitting frequency $f_9[k]$ is determined by $f_3[k-2N]$. In the duration V, the transmitting frequency of the frequency modulated signal 20 is represented by the sixth and the seventh rows of the equation (6), wherein the step number is between 2N+j and 4×N−j−1, and the transmitting frequency is composed of $$f_3\left[\frac{(k-2N+j)}{2}\right] \text{ and } f_4\left[\frac{(k-2N-j-1)}{2}\right].$$

When mod(k,2)=mod(j,2), waves with the corresponding frequency of $$f_3\left[\frac{(k-2N+j)}{2}\right]$$

are transmitted, and when mod(k,2)≠mod(j,2), waves with the corresponding frequency of $$f_4\left[\frac{(k-2N-j-1)}{2}\right]$$

are transmitted. In the duration VI, the transmitting frequency of the frequency modulated signal 20 is represented by the eighth row of the equation (6), wherein the step number is between 4×N−j and 4×N−1, and the transmitting frequency $f_p[k]$ is determined by $f_4[k-3N]$, i.e., in the duration VI, the frequency modulated signal 20 only includes the last j steps of the chirp signal C4.

The following descriptions take $T_{delay2}=4T_s$ and N=256 as an example (i.e. j=4). In the duration IV, k is between 512 and 515, and the transmitting frequency $f_p[k]$ is determined by $f_3[k-2N]$. Therefore, the transmitting frequencies are $f_3[0]$, $f_3[1], f_3[2], f_3[3]$, in order. That is, j represents the steps of the chirp signal C3 that are transmitted prior to the transmission of the chirp signal C4. In the duration V, k is between 516 and 1019. When k is equal to 516, both the values of mod(k,2) and mod(j,2) are equal to 0. Therefore, the transmitting frequency is $f_3[4]$. When k is equal to 517, the value of mod(k,2) is equal to 1, which is unequal to the value of mod(j,2), and therefore the transmitting frequency is $f_4[0]$. Then, the radar system transmits waves with the transmitting frequencies $f_3[5], f_4[1], f_3[6], f_4[2], \ldots, f_3[255], f_4[251]$, in order. In other words, after transmitting j steps of the chirp signal C3, the radar system transmits waves with the frequencies $$f_3\left[\frac{(k-508)}{2}\right] \text{ and } f_4\left[\frac{(k-517)}{2}\right]$$

by turns (i.e. by serially interleaving the chirp signal C3 and the chirp signal C4), and after the time delay $T_{delay2\_}$ is determined, the number of steps transmitted for the initial consecutive j steps of the chirp signal C3 is determined. In the duration VI, k is between 2044 and 2047, and the radar system continues to transmit waves with the transmitting frequencies $f_4[252], f_4[253], f_4[254]$ and $f_4[255]$ to complete a whole cycle of signal transmission.

Noticeably, the above embodiment illustrates that up-chirps are transmitted before down-chirps in the frequency modulated signal 20. However, different kinds of chirp signals may be adopted and arranged in different orders. In addition, the maximum frequency of the chirp signals C1 and C2 may have a frequency shift in relation to the maximum frequency of the chirp signals C3 and C4, and the frequency shift may be another programmable parameter of the radar system.

Figure 3A:
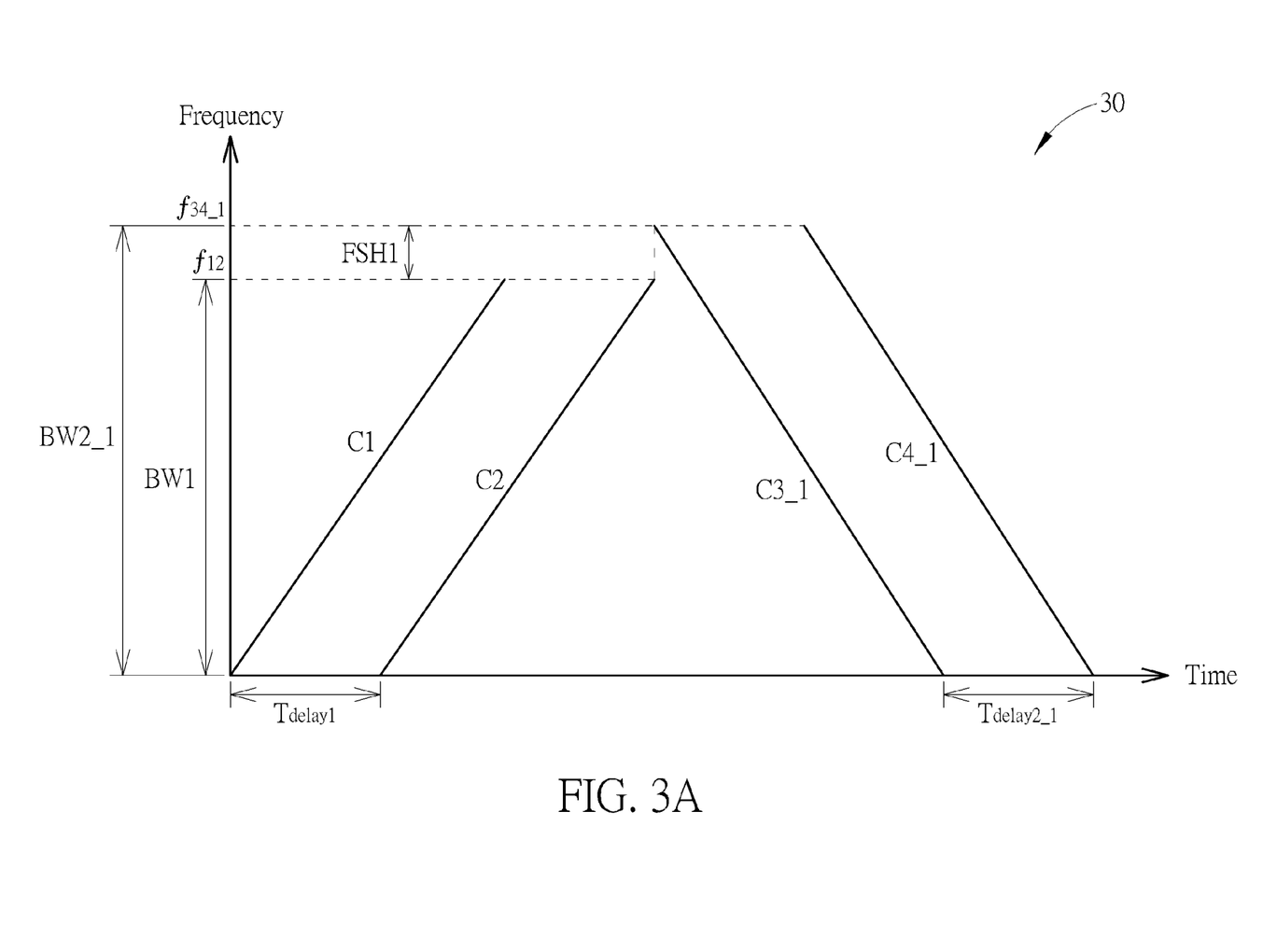
FIGS. 3A and 3B are time-frequency diagrams of frequency modulated signals according to embodiments of the present invention.
Figure 3B:
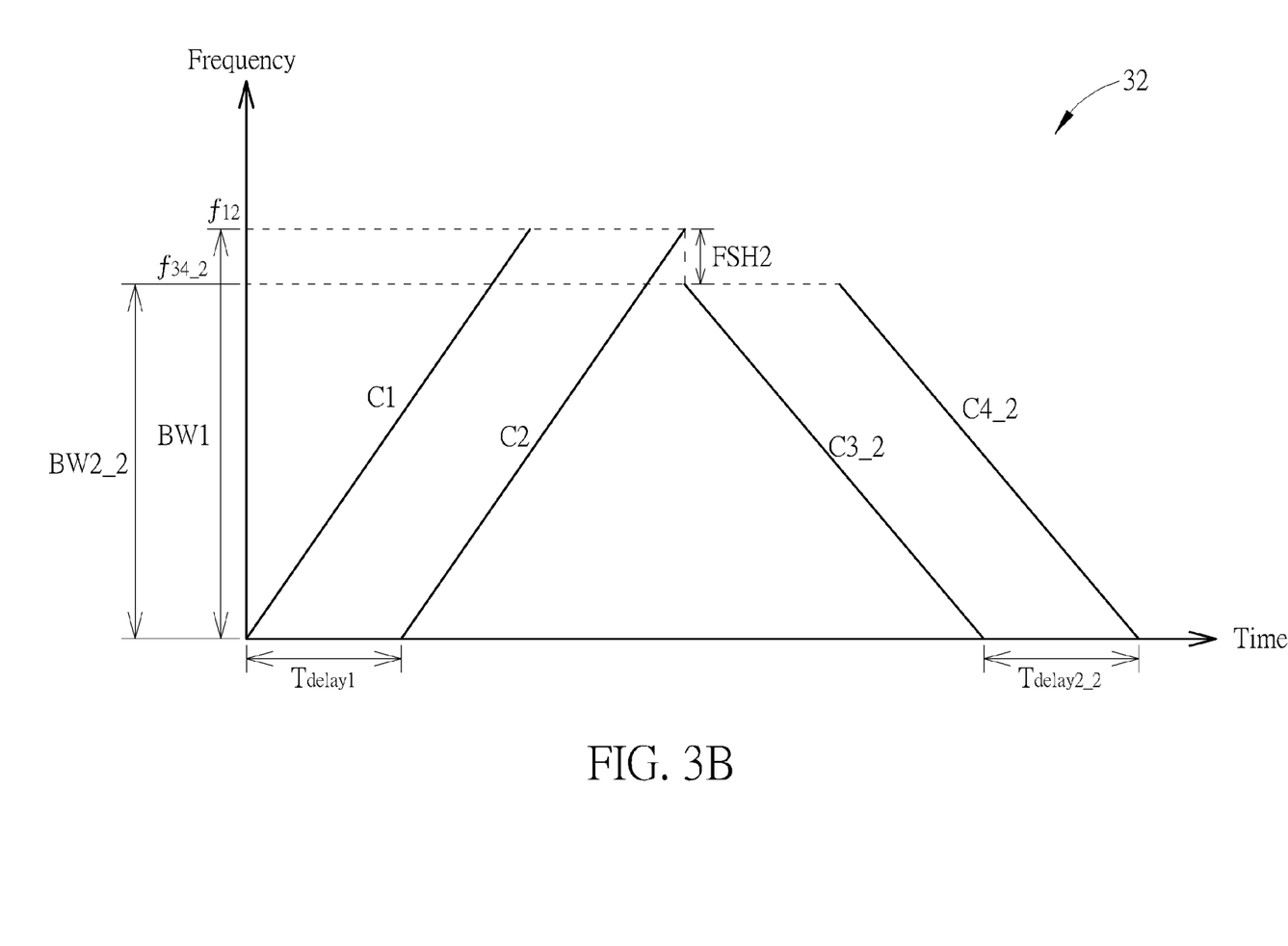

Please refer to FIG. 3A and FIG. 3B, which are time-frequency diagrams of frequency modulated signals 30 and 32 according to embodiments of the present invention. In order to clearly illustrate a concept of the frequency shift between the up-chirps and the down-chirps, the steps of the chirp signal are omitted, and only the frequency modulated bandwidths and the slops of the chirp signals are depicted in FIGS. 3A and 3B. As shown in FIGS. 3A and 3B, the frequency modulated signal 30 is composed of chirp signals C1, C2, C3_1 and C4_1, and the frequency modulated signal 32 is composed of chirp signals C1, C2, C3_2 and C4_2, wherein the chirp signals C1 and C2 are up-chirps, and the chirp signals C3_1, C4_1, C3_2 and C4_2 are down-chirps. The chirp signals C1 and C2 have the same slope and a time delay $T_{delay1}$ in between. The chirp signals C3_1 and C4_1 (or the chirp signals C3_2 and C4_2) have the same slope and another time delay $T_{delay2\_1}$ (or another time delay $T_{delay2\_2}$) in between. There is an upward frequency shift FSH1 (or a downward frequency shift FSH2) between an initial frequency $f_{34\_1}$ (or $f_{34\_2}$) of the chirp signals C3_1-C4_1 (or the chirp signals C3_2-C4_2) and the maximum frequency of the chirp signals C1-C2.

Noticeably, the distance resolution $\Delta R$ of the chirp signals C1 and C2 is determined by the frequency modulation bandwidth BW1, i.e.

$$\Delta R = \frac{c}{2 \cdot BW1} \quad (7)$$

The frequency modulated bandwidth of the chirp signals C3_1 and C4_1 (or the chirp signals C3_2 and C4_2) is changed to BW2_1 and BW2_2, respectively, according to the frequency shift FSH1 or FSH2, and the corresponding distance resolution is changed to $\Delta R_1$ or $\Delta R_2$ accordingly, i.e.

$$\Delta R_1 = \frac{c}{2 \cdot BW2\_1} \quad (8)$$

$$\Delta R_2 = \frac{c}{2 \cdot BW2\_2} \quad (9)$$

Different distance resolutions and different time delays of chirp signals may be combined to determine a frequency modulated signal, which results in a variety of waveforms. In other words, the signal generating method of the present invention provides the time delay and the frequency shift as the programmable parameters of the radar system. The relativity between radar transmission waves with different combinations become low. Consequently, when the receiver in the radar system process receiving signals, ghost targets may be recognized and interference may be eliminated, thereby reducing the false detection rate of the radar system.

Figure 4:
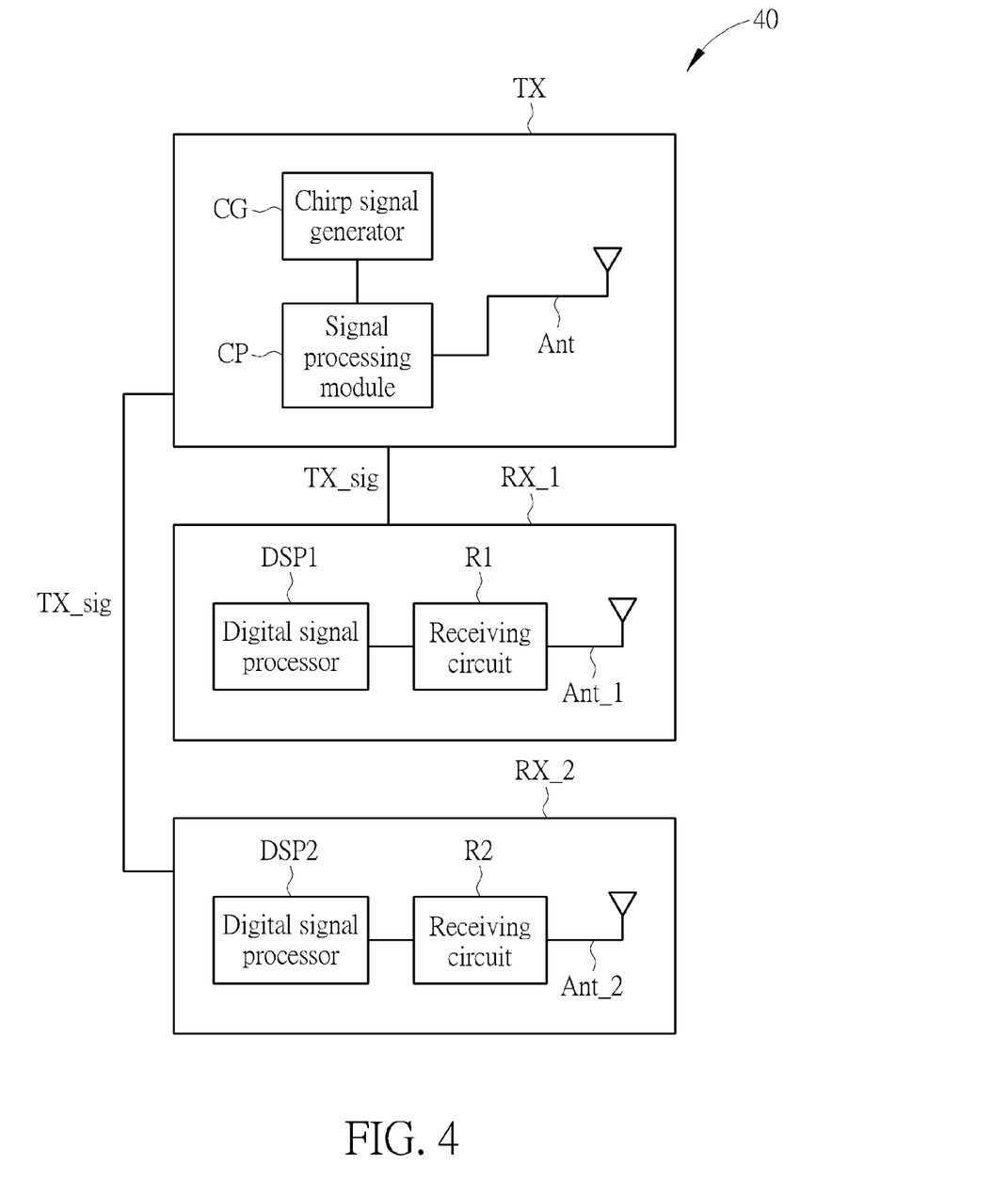
FIG. 4 is a schematic diagram of a radar system according to an embodiment of the present invention.

The abovementioned embodiments may be realized by software or firmware only, without adding any hardware device to the radar system. Moreover, the abovementioned embodiments may be applied to various radar systems, such as a forward collision warning system, a blind spot detection (BSD) system, a ranging or speed detection radar, and a frequency-modulation compressed radar system in order to recognize ghost targets and reduce false detection rate, but should not be limited herein. For example, please refer to FIG. 4, which is a schematic diagram of a radar system 40 according to an embodiment of the present invention. The radar system 40 is a one-transmission-two-reception (1T2R) monopulse radar system, and is able to detect relative speed, distance, angle, etc. of the targets. FIG. 4 uses different functional blocks to illustrate the components required for realizing an embodiment of the present invention, but should not be limited thereto. Those skilled in the art can make modifications and alterations accordingly. As shown in FIG. 4, the radar system 40 includes a transmitting device TS and receiving devices RX_1 and RX_2. The transmitting device TX includes a chirp signal generator CG, a signal processing module CP, and a transmitting antenna Ant. The chirp signal generator CG is used for generating the chirp signals C1-C4. The signal processing module CP is used for combining the chirp signals C1-C4 to determine a frequency modulated signal, and programming the time delay and the frequency shift of the maximum frequencies among the chirp signals C1-C4. The transmitting antenna Ant is used to transmitting the frequency modulated signal. The receiving devices RX_1 and RX_2 include receiving circuits R1 and R2, digital signal processors DSP1 and DSP2, and receiving antennas Ant_1 and Ant_2. After reflected signals of the radar system 40 are received by the receiving antennas Ant_1 and Ant_2, the signals pass through the receiving circuits R1 and R2, and then are processed by the digital signal processors DSP1 and DSP2. The digital signal processors DSP1 and DSP2 may process the receiving signals appropriately according to an output signal TX_sig related to the transmitting device TX.

Figure 5:
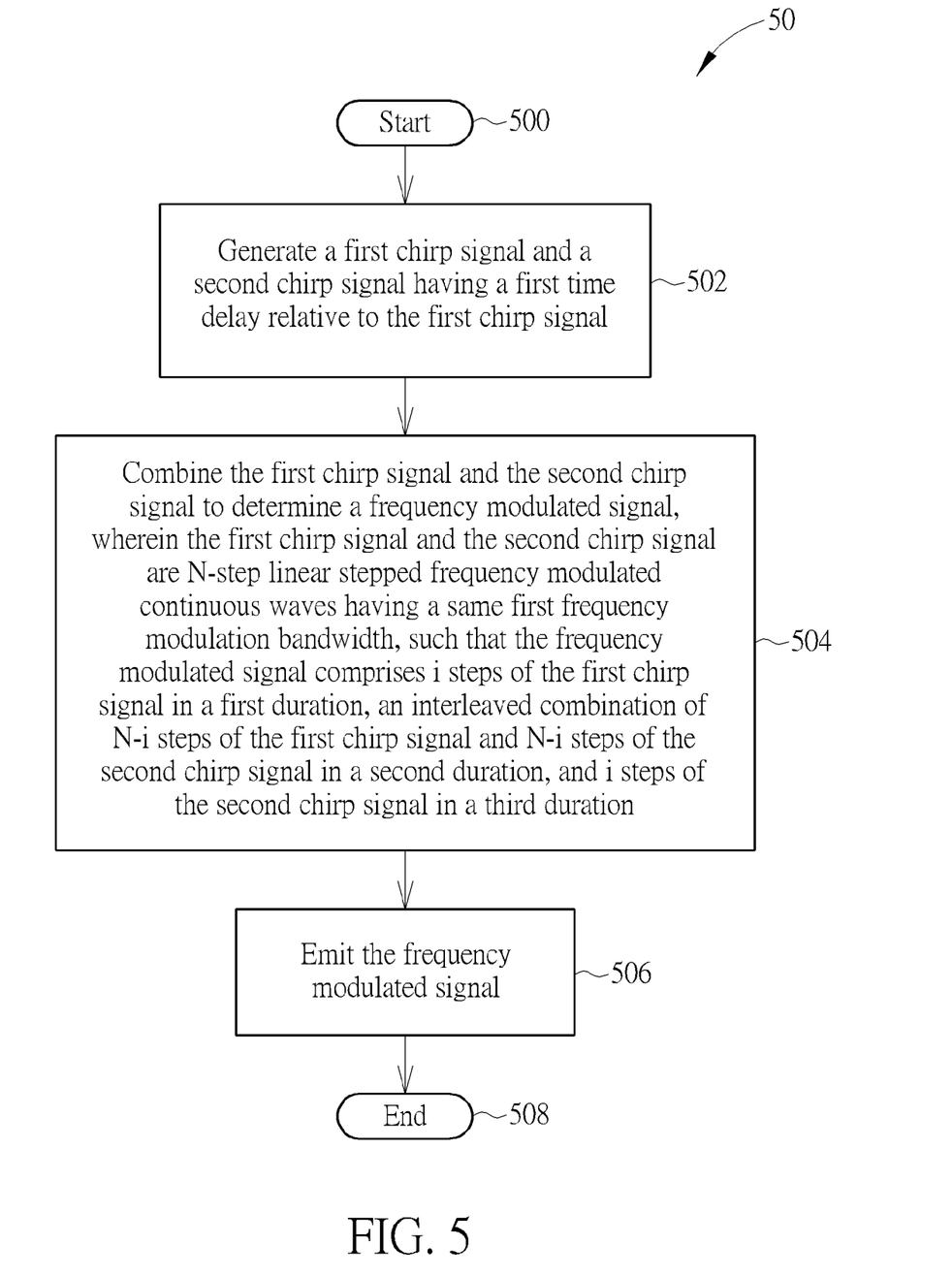
FIG. 5 is a flowchart of a signal generating process according to an embodiment of the present invention.

The radar transmission waves and the corresponding detection method may affect performance of the entire radar system during the processing of the radar signals; therefore, the generating method of the radar transmission waves is crucial for the performance of the radar system. Operations pertaining to the signal generating method in the radar system 40 mentioned above are summarized in a process 50 as shown in FIG. 5. The process 50 may be applied to the transmitting device TX of the radar system 40, and may include the following steps:

Step 500: Start.

Step 502: Generate a first chirp signal and a second chirp signal having a first time delay relative to the first chirp signal.

Step 504: Combine the first chirp signal and the second chirp signal to determine a frequency modulated signal, wherein the first chirp signal and the second chirp signal are N-step linear stepped frequency modulated continuous waves having a same first frequency modulation bandwidth, such that the frequency modulated signal comprises i steps of the first chirp signal in a first duration, an interleaved combination of N–i steps of the first chirp signal and N–i steps of the second chirp signal in a second duration, and i steps of the second chirp signal in a third duration.

Step 506: Emit the frequency modulated signal.

Step 508: End.

For elaborated illustrations and alterations regarding the process 50, please refer to the aforementioned embodiments.

To sum up, in an environment with multiple radar systems using the conventional technology for multi-target detection, the radar systems may easily interfere with each other, which results in false detection. In comparison, the present invention combines multiple chirp signals and provides the time delay and the frequency shift among the chirp signals as programmable parameters, so as to recognize ghost targets and reduce the false detection rate in a noisy environment, while providing high speed resolution and high distance resolution and simplifying the detection algorithm.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal generating method for a radar system, the radar system comprising a transmitting device, the signal generating method comprising:

the transmitting device generating a first chirp signal and a second chirp signal having a first time delay relative to the first chirp signal;

the transmitting device combining the first chirp signal and the second chirp signal to determine a frequency modulated signal, wherein the first chirp signal and the second chirp signal are N-step linear stepped frequency modulated continuous waves having a same first frequency modulation bandwidth, such that the frequency modulated signal comprises i steps of the first chirp signal in a first duration, an interleaved combination of N–i steps of the first chirp signal and N–i steps of the second chirp signal in a second duration, and i steps of the second chirp signal in a third duration, where i is smaller than N; and the transmitting device emitting the frequency modulated signal;

wherein i>1 and i=$T_{delay1}/T_s$, where $T_{delay1}$ represents the first time delay between the first chirp signal and second chirp signal, and $T_s$ represents time interval of each step of the first chirp signal and second chirp signal.

2. The signal generating method of claim 1, wherein the frequency modulated signal is determined according to the following function:

$$f_p[k] = \begin{cases} f_1[k], & \forall k = 0 \sim i-1 \\ f_1\left[\frac{k+i}{2}\right], & \mod(k,2) = \mod(i,2) \text{ and } \forall k = i \sim 2 \times N - i - 1 \\ f_2\left[\frac{(k-1-i)}{2}\right], & \mod(k,2) \neq \mod(i,2) \text{ and } \forall k = i \sim 2 \times N - i - 1 \\ f_2[k-N], & \forall k = 2 \times N - i \sim 2 \times N - 1 \end{cases}$$

where $f_p$ represents the frequency modulated signal, $f_1$ represents the first chirp signal, $f_2$ represents the second chirp signal, and k represents step number.

3. The signal generating method of claim 1, wherein the frequency modulated signal further comprises a third chirp signal and a fourth chirp signal, the third chirp signal and the fourth signal are M-step linear stepped frequency modulated continuous waves having a same second frequency modulation bandwidth, and the fourth chirp signal has a second time delay relative to the third chirp signal, such that the frequency modulated signal comprises j steps of the third chirp signal in a fourth duration, an interleaved combination of M–j steps of the third chirp signal and M–j steps of the fourth chirp signal in a fifth duration, and j steps of the fourth chirp signal in a sixth duration, where j is smaller than M.

4. The signal generating method of claim 3, wherein M is equal to N.

5. The signal generating method of claim 4, wherein the frequency modulated signal is determined according to the following function:

$$f_p[k] = \begin{cases} f_1[k], & \forall k = 0 \sim i-1 \\ f_1\left[\frac{k+i}{2}\right], & \mod(k,2) = \mod(i,2) \text{ and } \forall k = i \sim 2 \times N - i - 1 \\ f_2\left[\frac{(k-1-i)}{2}\right], & \mod(k,2) \neq \mod(i,2) \text{ and } \forall k = i \sim 2 \times N - i - 1 \\ f_2[k-N], & \forall k = 2 \times N - i \sim 2 \times N - 1 \\ f_3[k-2N], & \forall k = 2N \sim 2N + j - 1 \\ f_3\left[\frac{(k-2N+j)}{2}\right], & \mod(k,2) = \mod(j,2) \text{ and } \forall k = 2N + j \sim 4 \times N - j - 1 \\ f_4\left[\frac{(k-2N-j-1)}{2}\right], & \mod(k,2) \neq \mod(j,2) \text{ and } \forall k = 2N + j \sim 4 \times N - j - 1 \\ f_4[k-3N], & \forall k = 4 \times N - j \sim 4 \times N - 1 \end{cases}$$

where $f_p$ represents the frequency modulated signal, $f_1$ represents the first chirp signal, $f_2$ represents the second chirp signal, $f_3$ represents the third chirp signal, $f_4$ represents the fourth chirp signal, k represents step number.

6. The signal generating method of claim 3, wherein the first chirp signal and the second chirp signal are up chirp signals and the third chirp signal and the fourth chirp signal are down chirp signals.

7. The signal generating method of claim 3, wherein a frequency shift exists between the maximum frequency of the first and the second chirp signals and the maximum frequency of the third and the fourth chirp signals.

8. A radar system, comprising:

a transmitting device, comprising:

a chirp signal generator, for generating a first chirp signal and a second chirp signal having a first time delay relative to the first chirp signal;

a signal processing module, for combining the first chirp signal and the second chirp signal to determine a frequency modulated signal, wherein the first chirp signal and the second chirp signal are N-step linear stepped frequency modulated continuous waves having a same first frequency modulation bandwidth, such that the frequency modulated signal comprises i steps of the first chirp signal in a first duration, an interleaved combination of N−i steps of the first chirp signal and N−i steps of the second chirp signal in a second duration, and i steps of the second chirp signal in a third duration, where i is smaller than N; and a transmitting antenna, for emitting the frequency modulated signal; and at least one receiving device, for receiving reflected signals of the frequency modulated signal;

wherein i>1 and $i=T_{delay1}/T_s$, where $T_{delay1}$ represents the first time delay between the first and second chirp signals, and $T_s$ represents a time interval of each step of the first chirp signal and second chirp signal.

9. The radar system of claim 8, wherein the frequency modulated signal is determined according to the following function:

$$f_p[k] = \begin{cases} f_1[k], & \forall\, k = 0 \sim i-1 \\ f_1\left[\frac{k+i}{2}\right], & \mathrm{mod}(k,2)=\mathrm{mod}(i,2) \text{ and } \forall\, k = i \sim 2\times N - i - 1 \\ f_2\left[\frac{(k-1-i)}{2}\right], & \mathrm{mod}(k,2)\neq\mathrm{mod}(i,2) \text{ and } \forall\, k = i \sim 2\times N - i - 1 \\ f_2[k-N], & \forall\, k = 2\times N - i \sim 2\times N - 1 \end{cases}$$

where $f_p$ represents the frequency modulated signal, $f_1$ represents the first chirp signal, $f_2$ represents the second chirp signal, and k represents step number.

10. The radar system of claim 8, wherein the frequency modulated signal further comprises a third chirp signal and a fourth chirp signal, the third chirp signal and the fourth signal are M-step linear stepped frequency modulated continuous waves having a same second frequency modulation bandwidth, and the fourth chirp signal has a second time delay relative to the third chirp signal, such that the frequency modulated signal comprises j steps of the third chirp signal in a fourth duration, an interleaved combination of M−j steps of the third chirp signal and M−j steps of the fourth chirp signal in a fifth duration, and j steps of the fourth chirp signal in a sixth duration, where j is smaller than M.

11. The radar system of claim 10, wherein M is equal to N.

12. The radar system of claim 11, wherein the frequency modulated signal is determined according to the following function:

$$f_p[k] = \begin{cases} f_1[k], & \forall\, k = 0 \sim i-1 \\ f_1\left[\frac{k+i}{2}\right], & \mathrm{mod}(k,2)=\mathrm{mod}(i,2) \text{ and } \forall\, k = i \sim 2\times N - i - 1 \\ f_2\left[\frac{(k-1-i)}{2}\right], & \mathrm{mod}(k,2)\neq\mathrm{mod}(i,2) \text{ and } \forall\, k = i \sim 2\times N - i - 1 \\ f_2[k-N], & \forall\, k = 2\times N - i \sim 2\times N - 1 \\ f_3[k-2N], & \forall\, k = 2N \sim 2N + j - 1 \\ f_3\left[\frac{(k-2N+j)}{2}\right], & \mathrm{mod}(k,2)=\mathrm{mod}(j,2) \text{ and } \forall\, k = 2N + j \sim 4\times N - j - 1 \\ f_4\left[\frac{(k-2N-j-1)}{2}\right], & \mathrm{mod}(k,2)\neq\mathrm{mod}(j,2) \text{ and } \forall\, k = 2N + j \sim 4\times N - j - 1 \\ f_4[k-3N], & \forall\, k = 4\times N - j \sim 4\times N - 1 \end{cases}$$

where $f_p$ represents the frequency modulated signal, $f_1$ represents the first chirp signal, $f_2$ represents the second chirp signal, $f_3$ represents the third chirp signal, $f_4$ represents the fourth chirp signal, k represents step number.

13. The radar system of claim 10, wherein the first chirp signal and the second chirp signal are up chirp signals and the third chirp signal and the fourth chirp signal are down chirp signals.

14. The radar system of claim 10, wherein a frequency shift exists between the maximum frequency of the first and the second chirp signals and the maximum frequency of the third and the fourth chirp signals.

15. The signal generating method of claim 1, wherein the first chirp signal is generated prior than the second chirp signal in the second duration.

16. The radar system of claim 8, wherein the first chirp signal is generated prior than the second chirp signal in the second duration.

* * * * *